Figure 1:
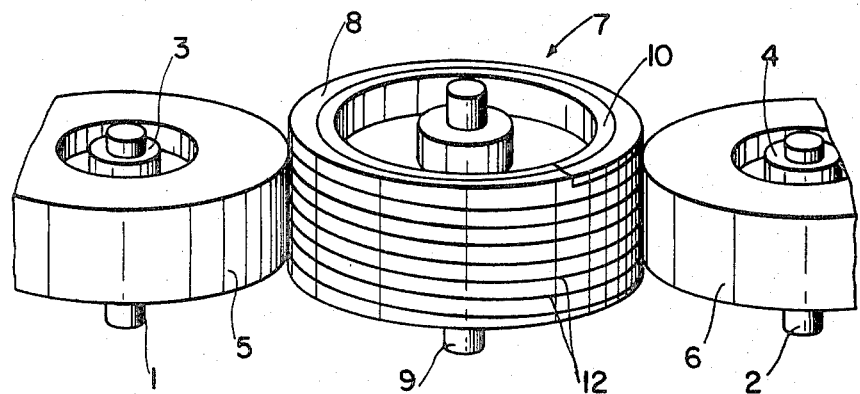

United States Patent [19]

Schoettle et al.

[11] 4,212,436
[45] Jul. 15, 1980

[54] TAPE TRANSPORT APPARATUS HAVING A CENTRAL CAPSTAN

[75] Inventors: Klaus Schoettle, Heidelberg; Werner Hoffmann, Ludwigshafen; Eduard Käemmer, Mutterstadt, all of Fed. Rep. of Germany

[73] Assignee: BASF Aktiengesellschaft, Ludwigshafen, Fed. Rep. of Germany

[21] Appl. No.: 969,552

[22] Filed: Dec. 14, 1978

[30] Foreign Application Priority Data

Dec. 15, 1977 [DE] Fed. Rep. of Germany ....... 2755932

[51] Int. Cl.² ................................................ G03B 1/04
[52] U.S. Cl. ..................................... 242/192; 226/182; 226/190
[58] Field of Search ...................... 242/192, 197–206; 226/181–183, 186, 190, 191

[56] References Cited

U.S. PATENT DOCUMENTS

| | | | |
|---|---|---|---|
| 3,077,293 | 2/1963 | Watkins | 226/186 |
| 3,132,785 | 5/1964 | Kunz | 226/186 X |
| 3,528,625 | 9/1970 | Bumb, Jr. | 242/192 |
| 3,834,601 | 9/1974 | Kelley | 226/191 |

FOREIGN PATENT DOCUMENTS 7613079  4/1976  Fed. Rep. of Germany .
1956807  9/1976  Fed. Rep. of Germany .

Primary Examiner—Leonard D. Christian
Attorney, Agent, or Firm—Keil & Witherspoon

[57] ABSTRACT

A transport apparatus for tape-like recording media in which a central capstan having a resilient peripheral portion simultaneously drives two tape reels. According to the invention, this peripheral portion has regions of different resilience produced, for example, by an elastically deformable annular insert which may be helical in shape. The tape transport apparatus of the invention can be advantageously used with all kinds of tape-like recording media, especially magnetic tapes for the recording/playback of high frequency signals, especially color video signals.

10 Claims, 3 Drawing Figures

TAPE TRANSPORT APPARATUS HAVING A CENTRAL CAPSTAN

The present invention concerns a tape transport apparatus comprising a central capstan and take-up and supply reels which can be urged toward the capstan by biasing means and are rotatably mounted on carriages that can be moved toward and away from the capstan, the capstan being provided with a resilient peripheral portion, so that compressive forces between the capstan and the take-up and supply reels and hence driving forces for rotating the reels can be produced, the resilient peripheral portion of the capstan have concentric regions of different resilience.

A tape transport apparatus comprising a capstan having a peripheral portion surrounded by a tire, the peripheral portion and tire exhibiting different moduli of elasticity, has been disclosed in German Published Application DAS No. 19 56 807. Here, the tire may be a thin metal ring for example, and the peripheral portion may consist of a resilient plastics material or hard rubber.

The reasons for such a special capstan design are to optimize the forces for maintaining constant tape tension and to improve response in the case of tape transports operating at high speed. A similar capstan design has also been disclosed in German Utility Model No. 76 13 079 according to which the peripheral portion is surrounded by at least one comparatively thin belt of material which is flexible in the radial direction, but substantially inelastic in the circumferential direction. Here again, the aim is to achieve constant tape tension without the need for a varying biasing force system or a varying torque brake system to compensate for variations in the tape reel diameters. The belt is in the form of one or more rings or layers of polyester film mounted on the resilient peripheral portion and optionally provided with an adhesive layer.

These prior art capstans suffer from the disadvantage that the said tires and rings or layers can easily become detached or displaced due to flexure or otherwise altered as a result of changes in temperature which may for example cause adhesive to exude from between the individual layers. These phenomena as well as the joints in the case of rings of polyester film result in uneven tape transportation which may cause inadmissibly high time base errors, for example in video recording.

An object of the present invention is to so design the central capstan for a tape transport apparatus, especially a transport apparatus for video recording, that tape flutter is virtually suppressed or reduced to such an extent that it can be compensated for more easily by electrical components.

In a tape transport apparatus comprising a central capstan and take-up and supply reels which can be urged toward the capstan by biasing means and are rotatably mounted on carriages that can be moved toward and away from the capstan, the capstan being provided with a resilient peripheral portion, so that compressive forces between the capstan and the take-up and supply reels and hence driving forces for rotating the reels can be produced, the resilient peripheral portion of the capstan having concentric regions of different resilience, this object is achieved by means of a region of lower resilience in the form of at least one elastically deformable annular insert which is arranged concentrically within the peripheral portion and is flexible in the radial direction while being inelastic in the circumferential direction.

This design has the advantage that the peripheral portion of the capstan acts as a mechanical low-pass filter which attenuates undesirable frequency components between the transported magnetic tape and the drive motor. Without having to vary the frictional relationships between the peripheral portion and the tape reels, a reduction of the flutter itself is achieved. In addition, surprising simplifications in the field of time base error correction and servo circuits are achieved.

In a further embodiment of the tape transport apparatus of the invention, the annular insert consists of a plurality of rings of the same diameter or parts which form rings of the same diameter, the said rings or ring parts being arranged above one another within the peripheral portion. A large number of possibilities of varying the attenuation chracteristic is thus achieved. Commercially available rings or ring parts may of course be used.

In yet another embodiment of the tape transport apparatus, the annular insert is in the form of at least one cylindrical member whose length approximately corresponds to the height of the peripheral portion of the capstan. This enables a particularly constant attenuation characteristic to be achieved over the entire width of the tape.

In a further advantageous embodiment of the tape transport apparatus, the annular insert is in the form of a helical member, the material from which it is made being much thinner than the peripheral portion of the capstan. Such a member can be manufactured particularly simply and economically.

In yet another advantageous embodiment, the annular insert, depending on its shape, may be inserted in one or more grooves in the peripheral portion. As a result, such tape transport apparatus can be mass-produced simply and economically.

In an even further advantageous embodiment, the annular insert is embedded in a material of greater resilience. It is thus possible to manufacture the resilient peripheral portion simultaneously with the annular insert.

Figure 2:
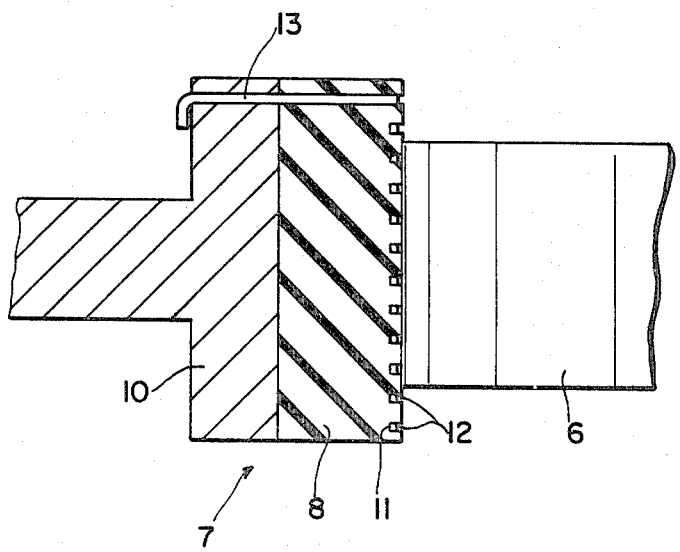
Figure 3:
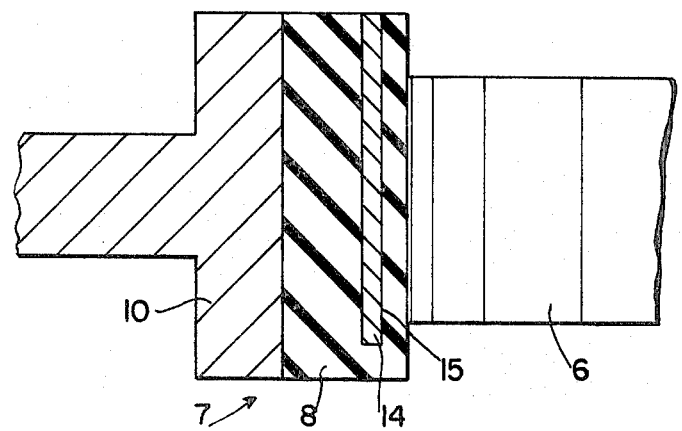

Further details of the invention are disclosed in the following description of the embodiments illustrated in the accompanying drawings, in which FIG. 1 is a view which shows in diagrammatic representation the tape reels and capstan of a tape transport apparatus according to the invention, the annular insert being in the form of a helix, FIG. 2 is an enlarged view, partly in section, showing a portion of a capstan and a tape reel, the annular insert being in the form of rings located in grooves, and FIG. 3 is the same view as in FIG. 2, but with the annular insert in the form of a cylindrical member.

FIG. 1 shows a tape transport apparatus comprising hubs 3 and 4 rotatably mounted on shafts 1 and 2, which hubs carry tape reels 5 and 6. The tape reels 5 and 6 are urged by biasing means, not shown, toward a central capstan 7 or, more precisely, toward the latter's resilient peripheral portion 8. The compressive forces are so chosen that the span of tape between supply and take-up reels 5 and 6 is under sufficient tension. The capstan 7 is mounted on a shaft 9 driven by a motor (not shown).

On the outer surface of the annular peripheral portion 8, a helix is represented by lines 12. The lines symbolize either a helical wire 12′ inserted in a helical groove 11 (FIG. 2), or a helical wire embedded in the resilient material of the peripheral portion 8. It is also possible to employ two or more helical wires which should not touch one another. The peripheral portion with the above-mentioned helical wire may be produced, for example, by casting the resilient material around the helix.

The end portion of the wire 12' bears the reference numeral 13 and serves to secure the helix at the top of the capstan 7. The same mode of securing may be employed at the bottom of the capstan. In principle, the helix may also be secured in any other suitable manner.

If the visible end 13 of the helix is disregarded, FIG. 2 may also show another embodiment in which a plurality of closed rings of the same or substantially the same diameter are inserted in circular grooves 11 in the peripheral portion 8. FIG. 3 shows an embodiment in which a vertical annular groove 15, cut into the capstan from above and concentric with the central axis, accommodates a cylindrical member 14 of the appropriate thickness and height. The said rings or cylindrical member may also be embedded in the peripheral portion 8, for example when the latter is cast.

The height of the peripheral portion 8 and the capstan 7, and the height of the whole group of suprajacent rings or ring parts should be so chosen that they each exceed the width of the tape to be transported. The tape reels should make contact with the peripheral portion substantially symmetrically of the central plane of the capstan 7, and thus exert pressure on the central region of the annular insert as well. If a helix is employed an annular insert, 2 to 3 turns should extend above and below the region of tape contact.

The diameter of the wire insert advantageously lies within the range of 0.05 to 0.15 mm, while the thickness of the resilient peripheral portion 8 is approximately 1 to 2.5 mm. It is also advantageous if the thickness of the wire insert is between 1/10 to 1/20 of the thickness of the peripheral portion 8. The thickness of the wall of the cylindrical member should be of the same order of magnitude.

If the groove(s) in the peripheral portion is (are) used to accommodate the wire helix (wire rings), then the depth of the groove(s) should be approximately 1 to 3 times, preferably 1.5 to 2.5 times, the thickness of the wire. This prevents direct contact between the tape reels and wire while ensuring that the wire is seated sufficiently firmly in the groove. Depending on the type of tape-like material, contact between the surface of the wire(s) and the tape reels may even be desirable.

The resilient peripheral portion consists advantageously of a polyurethane or a silicone rubber with a Shore A hardness of between approximately 30 and 80, and preferably between 50 to 65, with at most only slight permanent set, preferably no permanent set.

The material from which the wire inserts are made may, for example, be stainless steel or a polymeric material, such as filaments made of aromatic polyamides derived from p-phenylene diamine and terephthalic acid or m-phenylene diamine and isophthalic acid, trimellitic anhydride, or diaminodiphenyl ether. Each of these materials should have a tensile strength greater than 150 kg/mm$^2$. Obviously, other strong metal wires and plastics fibers can also be used.

The choice of material is determined exclusively by the intended application because the advantageous materials proposed above have different advantages for different applications, while exhibiting approximately the same tensile strength. For example to eliminate troublesome electrostatic charges, the employment of steel wire is expedient, whereas filaments made of trimellitic anhydride have the advantage that their bending modulus is about half that of steel wire. A more favorable ratio of tangential strength to radial deformation is obtained with such filaments than with steel wire.

If a plurality of rings or a helix is used, then these "wires", by which filaments are also meant, should be arranged uniformly over the height of the peripheral rim 8.

If extreme demands are made on the capstan as regards true running, as is the case in video recorders operating at high speed, it is advantageous to regrind the capstan surface after the insertion of the wire(s) in the groove(s) which has (have) a depth of at least twice the wire thickness, in order to eliminate the formation of bulges or other surface irregularities produced during insertion of the wire.

If a helix is employed, its pitch should be from 5 to 15 times the wire thickness.

Insertion of the wire may be effected in any suitable manner.

When a helix is employed, the wire should be drawn into the helical groove, under a tension which should as far as possible be absolutely constant, by means of a mechanical device advancing according to the envisaged pitch. Such a device, however, does not form part of the present invention.

The ends of a helical wire inserted in some suitable manner may be drawn through slots or bores in the upper and lower surfaces of the hub 10 (made for example of metal) of the capstan 7, which slots or bores extend through the peripheral portion 8 and hub 10, and are then bent over, glued or secured in some other way as indicated above (end 13 in FIG. 2).

Embodiments comprising annular inserts in the form of helices have been tested under field operating conditions. The capstan diameters were between approximately 15 and 90 mm, and the thickness of the wire was between 0.5 and 1 mm, the peripheral portion having a thickness of approximately 1.5 mm and being made of polyurethane rubber.

It was found that transportation of the tape at the capstan could be improved to a surprising degree in the following respect:

The upper critical frequency for low frequencies, which, without the annular insert of the invention, is between 100 and 200 Hz, is shifted by a factor of at least 2, i.e. into the range between 200 and 400 Hz, and the amplitude of the high-frequency longitudinal tape oscillations (flutter) is reduced by at least one third.

These surprising results make it possible to cut the cost of the equipment required for time base correction in the playback of color video signals recorded on tape. The customary electronic storage means, e.g. charge storage devices, used to correct time base error signals of high frequency, can be either reduced in number or dispensed with altogether, so that a simple servo control for the motor is all that is needed.

This reduction in the number of storage means used for time base error correction can be achieved in any transmission system for analog signals. The embodiments of the invention can be used with particular advantage in video signal transmission systems, preferably in apparatus for the recording and reproduction of video signals.

We claim:

1. In a tape transport apparatus comprising a capstan, take-up and supply reels and biasing means, said reels being capable of being urged toward the capstan by the biasing means for transporting the tape from the supply reel to the take-up reel, said capstan having a resilient peripheral portion with concentric regions of different resilience which are substantially inelastic in their circumferential direction, and having a driving surface for frictionally driving at least one of the take-up and supply reels, the improvement that at least one annular insert is provided within said resilient peripheral portion for producing a concentric region of lower resilience than the resilience of the remainder of the peripheral portion while the frictional driving surface of the peripheral portion is maintained effective, said at least one annular insert being elastically deformable in the radial direction so as to merely reduce the radial flexibility of the peripheral portion, and lacking elastic deformability in the circumferential direction so as to enhance the non-flexibility of the peripheral portion in the circumferential direction.

2. A tape transport apparatus according to claim 1, wherein the annular insert consists of a plurality of rings of the same diameter, the said rings being arranged above one another within the peripheral portion of the capstan.

3. A tape transport apparatus according to claim 1, wherein the annular insert consists of parts which form rings of the same diameter; the rings thus formed being arranged above one another within the peripheral portion of the capstan.

4. A tape transport apparatus according to claim 1, wherein the annular insert consists of at least one cylindrical member whose length corresponds approximately to the height of the peripheral portion of the capstan.

5. A tape transport apparatus according to claim 1, wherein the annular insert consists of a helical member, the material from which it is made being much thinner than the peripheral portion of the capstan.

6. A tape transport apparatus according to claim 1, wherein the annular insert, depending on its shape, is inserted in one or more grooves in the peripheral portion.

7. A tape transport apparatus consisting essentially of a central capstan, take-up and supply reels, reel carriages and biasing means, the said reels being rotatably mounted on said carriages and being capable of being urged toward the capstan by the biasing means, which carriages can be moved toward and away from the capstan which has a resilient peripheral portion, so that compressive forces between the capstan and the take-up and supply reels and hence driving forces for the rotation of the reels can be produced, the resilient peripheral portion of the capstan having concentric regions of different resilience, characterized by a region of lower resilience in the form of an at least one elastically deformable annular insert which is embedded concentrically within the peripheral portion and is flexible in the radial direction while being inelastic in the circumferential direction, said peripheral portion being of a material of greater resilience than that of said insert.

8. A tape transport apparatus comprising a central capstan and take-up and supply reels which can be urged toward the capstan by biasing means and are rotatably mounted on carriages that can be moved toward and away from the capstan, the capstan being provided with a resilient peripheral portion, so that compressive forces between the capstan and the take-up and supply reels and hence driving forces for rotating the reels are produced, the resilient peripheral portion of the capstan having concentric regions of different resilience, characterized by a region of lower resilience in the form of at least one elastically deformable helical member which is arranged in at least one groove concentrically within the peripheral portion and which is flexible in the radial direction while being inelastic in the circumferential direction.

9. A tape transport apparatus according to claim 8, wherein the height of the helical member corresponds approximately to the height of the peripheral portion of the capstan.

10. A tape transport apparatus according to claim 8 or claim 9, wherein the material from which the helical member is made is much thinner than the peripheral portion of the capstan.

* * * * *